United States Patent
Lu et al.

(10) Patent No.: US 12,495,392 B2
(45) Date of Patent: Dec. 9, 2025

(54) PAGING MESSAGE FOR MOBILE TERMINATING SMALL DATA TRANSMISSION

(71) Applicant: T-Mobile USA, Inc., Bellevue, WA (US)

(72) Inventors: Kun Lu, Bellevue, WA (US); John Humbert, Roeland Park, KS (US); Scott Francis Migaldi, Cary, IL (US); Christopher H. Joul, Bellevue, WA (US); Jun Liu, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 478 days.

(21) Appl. No.: 17/980,362

(22) Filed: Nov. 3, 2022

(65) Prior Publication Data

US 2024/0155556 A1    May 9, 2024

(51) Int. Cl.
*H04W 76/30* (2018.01)
*H04W 68/00* (2009.01)
*H04W 76/27* (2018.01)

(52) U.S. Cl.
CPC ......... *H04W 68/005* (2013.01); *H04W 76/30* (2018.02)

(58) Field of Classification Search
CPC ........................... H04W 68/005; H04W 76/30
USPC ...................................................... 455/485
See application file for complete search history.

(56) References Cited

U.S. PATENT DOCUMENTS

| | | | | |
|---|---|---|---|---|
| 2019/0028860 A1* | 1/2019 | Futaki | .................. | H04W 76/27 |
| 2019/0215302 A1* | 7/2019 | Chandramouli | ........ | H04L 12/66 |
| 2022/0078697 A1* | 3/2022 | Tseng | .................... | H04W 72/21 |
| 2022/0182859 A1* | 6/2022 | Da Silva | ........... | H04W 52/0219 |
| 2022/0225252 A1 | 7/2022 | Kiilerich Pratas et al. | | |
| 2022/0322482 A1* | 10/2022 | Xu | ......................... | H04W 76/27 |
| 2022/0377800 A1* | 11/2022 | Chin | ................. | H04W 74/0833 |
| 2023/0030443 A1* | 2/2023 | Chen | .................... | H04W 76/27 |
| 2023/0040675 A1* | 2/2023 | Gupta | ................... | H04W 76/30 |
| 2023/0156716 A1* | 5/2023 | Golitschek Edler Von Elbwart | ............. | H04W 68/005 370/329 |

(Continued)

FOREIGN PATENT DOCUMENTS

| | | |
|---|---|---|
| EP | 2727435 B1 | 2/2020 |
| WO | WO2020254960 A1 | 12/2020 |
| WO | WO2021015655 A1 | 1/2021 |

OTHER PUBLICATIONS

3GPP, "Impacts of SDT on NAS", 3rd Generation Partnership Project, vol. CT WG1, Aug. 12, 2021, pp. 1-5.

(Continued)

*Primary Examiner* — Mark G. Pannell
(74) *Attorney, Agent, or Firm* — Lee & Hayes, P.C.

(57) ABSTRACT

A user equipment (UE) can be a mobile terminating (MT) device that may receive data from another UE or other network element via a telecommunication network. When a small data payload is available for an MT UE, a base station of the telecommunication network can send a paging message to the UE that includes a Mobile Terminating Small Data Transmission (MT-SDT) paging cause. Based on the MT-SDT paging cause in the paging message, the UE can use Small Data Transmission (SDT) procedures to respond to the paging message. The SDT procedures can allow the UE to obtain the small data payload while the UE remains in a Radio Resource Control (RRC) Inactive state.

20 Claims, 9 Drawing Sheets

(56) References Cited

U.S. PATENT DOCUMENTS

| | | | |
|---|---|---|---|
| 2023/0209463 A1* | 6/2023 | Shih | H04W 52/0216 370/311 |
| 2023/0209504 A1* | 6/2023 | Agiwal | H04W 68/02 455/458 |
| 2023/0217532 A1* | 7/2023 | Kim | H04W 74/0833 455/458 |
| 2023/0309081 A1* | 9/2023 | Huang | H04W 68/02 |
| 2023/0379881 A1* | 11/2023 | Zhang | H04W 72/04 |
| 2024/0023042 A1* | 1/2024 | Chen | H04W 56/0015 |
| 2024/0179785 A1* | 5/2024 | Ma | H04L 1/1864 |
| 2024/0244706 A1* | 7/2024 | Koskinen | H04W 76/11 |
| 2024/0275523 A1* | 8/2024 | Meng | H04L 5/0091 |
| 2024/0306242 A1* | 9/2024 | Shete | H04W 68/02 |
| 2024/0314734 A1* | 9/2024 | Ma | H04W 76/30 |
| 2024/0406900 A1* | 12/2024 | Golitschek Edler Von Elbwart | H04W 56/0015 |

OTHER PUBLICATIONS

Nokia, "Small Data Transmission Enhancements for Rel-18", retrieved on Jun. 7, 2021 at <<http://ftp.3gpp.org/tsg_ran/TSG_RAN/TSGR_AHs?2021_06_RAN_Rel18_WS/Docs/RWS-210080.zip>>, 3GPP, No. Jun. 28, 2021-Jul. 2, 2021, Jun. 7, 2021, pp. 1-11.

Search Report for European Application No. 23207562.2, Dated Apr. 29, 2024, 13 pages.

ETSI TS 138 300, "5G; NR; NR and NG-RAN Overall description; Stage-2 (3GPP TS 38.300 v. 17.0.0 Release 17)", available at <<https://www.etsi.org/deliver/etsi_ts/138300_138399/138300/17.00.00_60/ts_138300v170000p.pdf>>, May 2022, 207 pages.

ETSI TS 138 331, "5G; NR; NR and NG-RAN Overall description; Stage-2 (3GPP TS 38.331v 17.0.0 Release 17)", available at <<https://www.etsi.org/deliver/etsi_ts/138300_138399/138331/17.00.00_60/ts_138331v170000p.pdf>>, May 2022, 1197 pages.

Khlass et al., "Efficient Handling of Small Data Transmission for RRC Inactive UEs in 5G Networks", in the Proceedings of the 2021 IEE 93rd Vehicular Technology Conference, Apr. 25, 2021, pp. 1-7.

3GPP, "Technical Specification Group Radio Access Network; NR; Radio Resource Control (RRC) protocol specification (Release 17)", 3GPP TS 38.331, No. V17.2.0, Oct. 2, 2022, pp. 1-1298.

Office Action for European Application No. 23207562.2, dated Jul. 11, 2025, 9 pages.

* cited by examiner

PAGING MESSAGE FOR MOBILE TERMINATING SMALL DATA TRANSMISSION

BACKGROUND

In a telecommunication network, a user equipment (UE) can wirelessly connect to one or more base stations in order to engage in voice calls, video calls, data transfers, or other types of communications. For example, a mobile device, such as a smart phone, can wirelessly connect to one or more gNBs or other base stations of a radio access network (RAN) to access the telecommunication network.

When a UE initiates a communication session or a transfer of data via the telecommunication network, the UE can be considered a Mobile Originating (MO) device. However, when another device, server, or other element initiates such a communication session or transfer of data directed to the UE, the UE can be considered a Mobile Terminating (MT) device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
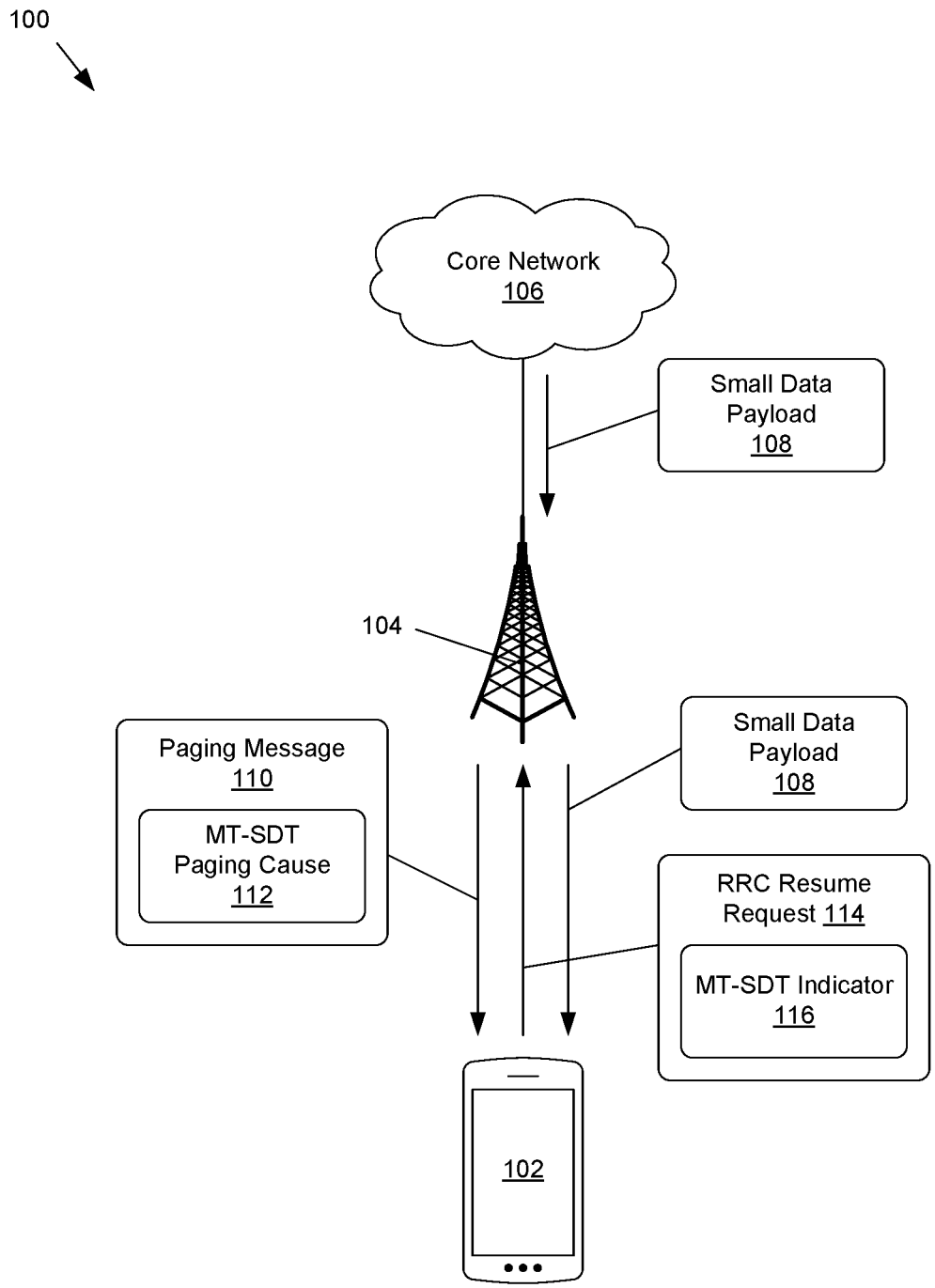
FIG. 1 shows an example of a network environment in which a UE can connect to a telecommunication network via at least one base station.

A UE can wirelessly connect to a base station of a telecommunication network, such as a gNB of a fifth generation (5G) New Radio (NR) radio access network. When connected to the base station, the UE can send uplink data to the base station and receive downlink data from the base station.

For example, the UE can establish a Radio Resource Control (RRC) connection with the base station. The UE can use one or more bearers, such as data radio bearers (DRBs), associated with the established RRC connection to send and/or receive data while the UE is in an RRC Connected state. In some situations, the RRC connection can be released when the RRC connection is no longer being used, and the UE can enter an RRC Idle state. The RRC Idle state may reduce power consumption of the UE relative to the RRC Connected state. When the UE is to send and/or receive data again, the UE can exchange messages with a base station to establish a new RRC connection, and can switch from the low-power RRC Idle state back to the RRC Connected state.

In many cases, the UE may intermittently send and/or receive small data payloads, such as data payloads that have sizes of 50 bytes, 100 bytes, or any other threshold size. For example, such small data payloads may be associated with instant messages, push notifications, heartbeat messages, transfers of sensor data, transfers of location data, or other small amounts of data.

The UE could switch between the RRC Idle state and the RRC Connected state for transfers of such small data payloads, for example by establishing a new RRC connection with a base station each time the UE is to send or receive a small data payload, and then releasing the RRC connection after the small data payload has been transferred. However, because establishing a new RRC connection can be a relatively lengthy process and involve the exchange of multiple signaling messages between the UE and the base station, establishing a new RRC connection only for a short period of time for the transfer of each small data payload can be inefficient. For instance, establishing a new RRC connection for each small data payload can be associated relatively high volumes of signaling between the UE and base stations, relatively high latencies associated with RRC connection establishment procedures, and relatively high power consumption levels of the UE.

To avoid setting up new RRC connections and changing between the RRC Idle state and the RRC Connected state, the UE can enter an RRC Inactive state instead of the RRC Idle state. In the RRC Inactive state, an established RRC connection can be suspended instead of released, such that the suspended RRC connection can be reactivated and/or used more quickly and with less latency and signaling than establishing a new RRC connection. Similar to the RRC Idle state, the RRC Inactive state can reduce power consumption of the UE relative to the RRC Connected state.

Because an established RRC connection is suspended and is not released while the UE is in the RRC Inactive state, the UE can use Small Data Transmission (SDT) procedures to resume and/or use one or more DRBs associated with the established RRC connection to send and/or receive small data payloads. Via SDT procedures, the UE can remain in the low-power RRC Inactive state, and avoid switching to the RRC Connected state. In some situations, SDT procedures that allow the UE to remain in the RRC Inactive state can also be used more quickly, and/or with less signaling volume, than changing between the RRC Inactive state and the RRC Connected state.

Many existing SDT procedures are designed for Mobile Originating (MO) UEs, where an MO UE initiates an uplink transfer of a small data payload while remaining in the RRC Inactive state. Some SDT procedures may also allow a Mobile Terminating (MT) UE to receive a small data payload while remaining in the RRC Inactive state. However, in existing systems, such an MT UE may not be able to determine when a small data payload is available for the MT UE, and thus not be able to determine when to stay in the RRC Inactive state and to use SDT procedures instead of switching from the RRC Inactive state to the RRC Connected state.

For example, if a downlink transfer of a small data payload is available for a MT UE, a base station may send a paging message to the MT UE. However, in existing systems such a paging message may not indicate that a small data payload is available for the MT UE. Accordingly, in existing systems, the MT UE may be configured to respond to such a paging message by moving from the low-power RRC Inactive state to the high-power RRC Connected state, for example as the MT UE may do when responding to a paging message associated with an incoming voice call directed to the MT UE. As such, because paging messages in existing systems are not configured to indicate when small data payloads are available for MT UEs, such a paging message may prompt an MT UE to enter the high-power RRC Connected state to resume a suspended RRC connection in order to receive a small data payload, instead of using SDT procedures to receive the small data payload while the MT UE remains in the low-power RRC Inactive state.

The systems and methods described herein allow a base station to directly indicate, within a paging message sent to an MT UE that is in the RRC Inactive state, that a small data payload is available for the MT UE. Accordingly, because the paging message directly indicates that the small data payload is available for the MT UE, the MT UE can determine to respond to the paging message by using SDT procedures that allow the MT UE to receive the small data payload via one or more resumed DRBs while the MT UE remains in the RRC Inactive state. The MT UE can therefore avoid switching from the RRC Inactive state to the RRC Connected state in order to respond to the paging message.

Example Environment

FIG. 1 shows an example 100 of a network environment in which a UE 102 can connect to a telecommunication network via at least one base station 104. When the UE 102 connects to the telecommunication network, the UE 102 can engage in communication sessions for voice calls, video calls, messaging, data transfers, and/or any other type of communication via the telecommunication network.

The UE 102 can be any device that can wirelessly connect to the base station 104. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, an Internet of Things (IoT) device, a personal computer (PC) such as a laptop, desktop, or workstation, or any other type of computing or communication device.

The base station 104 can be part of an access network of the telecommunication network, such as a radio access network (RAN). The telecommunication network can also have a core network 106 linked to the access network. The UE 102 can wirelessly connect to the base station 104 of the access network, and in turn be connected to the core network 106 via the base station 104. The core network 106 can also link the UE 102 to an Internet Protocol (IP) Multimedia Subsystem (IMS), the Internet, and/or other networks.

The UE 102 and elements of the telecommunication network, such as the base station 104, other elements of the access network, and/or the core network 106, can be compatible with one or more radio access technologies, wireless access technologies, protocols, and/or standards. For example, the UE 102, the base station 104, and/or the core network 106 can support 5G NR technology, Long-Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology.

As an example, the base station 104 can be a gNB of a 5G access network. As another example, the access network can be an LTE access network, known as an Evolved UMTS Terrestrial Radio Access Network (E-UTRAN), and the base station 104 can be an evolved Node B (eNB) of the LTE access network. The core network 106 can also be based on LTE or 5G. For instance, the core network 106 can be a 5G core network or an LTE packet core network known as an Evolved Packet Core (EPC). The base station 104 and the core network 106 may be based on the same radio access technology, or different radio access technologies. For instance, in some examples the base station 104 can be a 5G gNB that is linked to an LTE core network and/or a 5G core network.

The UE 102 can transmit data to, and/or receive data from, the base station 104. For example, the UE 102 can receive downlink transmissions from the base station 104, for instance to download data, receive voice and/or video data during calls, and/or receive any other type of data. As another example, the UE 102 can send uplink transmissions to the base station 104 to upload data, submit requests for services, transmit voice and/or video data during calls, and/or to transmit any other type of data from the UE 102 to the base station 104, the core network 106, an IMS, the Internet, and/or other networks. The UE 102 can establish a Radio Resource Control (RRC) connection with the base station 104, such that the UE 102 and the base station 104 can use the RRC connection for downlink and/or uplink transmissions.

The UE 102 can be configured to transition between different RRC states. For example, RRC states can include an RRC Idle state (RRC_IDLE) in which the UE 102 does not have an RRC connection with a base station, an RRC Connected state (RRC_CONNECTED) in which the UE 102 does have an active RRC connection with a base station, and an RRC Inactive state (RRC_INACTIVE) in which an established RRC connection between the UE 102 and a base station is suspended. Different RRC states can be associated with different power consumption levels, as discussed further below.

The UE 102 can be in the RRC Idle state when no RRC connection is established between the UE 102 and a base station. For example, the UE 102 can be in the RRC Idle state when the UE 102 initially powers on and has not yet established an RRC connection with a base station. As another example, when an established RRC connection between the UE 102 and a base station is released, the UE 102 can move from the RRC Connected state to the RRC Idle state. Because the UE 102 does not have an established RRC connection with a base station when the UE 102 is in the RRC Idle state, UE 102 can consume less power in the RRC Idle state relative to when the UE 102 is in the RRC Connected state.

The UE 102 can enter the RRC Connected state when an RRC connection is established between the UE 102 and a base station. To establish a new RRC connection, the UE 102 can send an RRC connection request message to the base station 104. The base station 104 can respond with an RRC connection setup message, and the UE 102 can in turn respond with an RRC connection setup complete message and move to the RRC Connected state. The base station 104 can also configure the RRC connection, for instance by setting up radio bearers, such as default and/or dedicated bearers. Bearers associated with the RRC connection can include one or more signaling radio bearers (SRBs) used to transmit RRC messages and/or other signaling messages, and/or one or more data radio bearers (DRBs) used to transmit data. The base station 104 can send information about such bearers, and/or other configuration information, to the UE 102 in an RRC reconfiguration message, and the UE 102 can respond with an RRC reconfiguration complete message.

At this point, the UE 102 can be in the RRC Connected state and can send and/or receive data via one or more DRBs associated with the RRC connection with the base station 104. Because the UE 102 has an established RRC connection with a base station when the UE 102 is in the RRC Connected state and may use the established RRC connection to send and/or receive data, the UE 102 can consume more power while in the RRC Connected state relative to when the UE 102 is in the RRC Idle state.

Although the UE 102 can switch between the RRC Idle state and the RRC Connected state, switching from the RRC idle state to the RRC connected state can take time and can also involve the exchange of numerous signaling messages between the UE 102 and a base station to establish a new RRC connection as discussed above. The UE 102 can also use more power in the RRC connected state relative to the RRC idle state, as discussed above.

To reduce the latency and signaling volume associated with frequently switching back and forth between the RRC Idle state and the RRC Connected state, which involves the establishment of a new RRC connection each time the UE 102 moves from the RRC Idle state to the RRC Connected state, the UE can enter the RRC Inactive state instead of the RRC Idle state. When the UE 102 is in the RRC Inactive state, an established RRC connection associated with the UE 102 can be suspended and made inactive. When the UE 102 enters the RRC Inactive state, the UE 102 and the base station associated with an established RRC connection can both store Access Stratum (AS) context information associated with the established RRC connection, such as bearer configuration information and other information associated with the established RRC connection. A connection between the base station and the core network 106, associated with the established RRC connection, can also continue to exist while the UE 102 is in the RRC Inactive state. Similar to the RRC Idle state, the UE 102 can consume less power while in the RRC Inactive state than in the RRC Connected state, because the RRC connection is suspended.

If the UE 102 later determines to switch back from the RRC Inactive state to the RRC Connected state, the existing suspended RRC connection can be reactivated and used more quickly, and with less signaling, relative to the time and signaling volume that would be used to establish a new RRC connection during a change from the RRC Idle state to the RRC Connected state. For example, because the UE 102 and the base station stored the AS context information associated with the suspended RRC connection, and because an associated connection to the core network 106 was maintained while the UE 102 was in the RRC Inactive state, the suspended RRC connection can be reactivated and/or used more quickly than setting up a new RRC connection. Accordingly, in some situations, the UE 102 can move from the RRC Inactive state to the RRC Connected state to reactivate a suspended RRC connection, as described above.

However, in other situations, the UE 102 can use Small Data Transmission (SDT) procedures to send and/or receive small data payloads, such as the small data payload 108 shown in FIG. 1, via one or more DRBs associated with an RRC connection without the UE 102 changing from the RRC Inactive state to the RRC Connected state. For example, although the RRC connection may have been suspended when the UE 102 entered the RRC Inactive state, one or more DRBs associated with the RRC connection can be resumed and used at least temporarily during SDT procedures to transmit data while the UE 102 remains in the RRC Inactive state. Accordingly, instead of moving to the RRC Connected state to send and/or receive small data payloads, the UE 102 can use SDT procedures to send and/or receive small data payloads while the UE 102 remains in the RRC Inactive state. Relative to the UE 102 moving to the RRC Connected state, SDT procedures that allow the UE 102 to remain in the RRC Inactive state can be associated with lower latencies, lower signaling volumes between the base station and the UE 102, and/or lower power consumption levels of the UE 102.

SDT procedures can be used when the UE 102 is a Mobile Originating (MO) device or a Mobile Terminating (MO) device. For example, when the UE 102 is an MO device that has a small data payload to transmit uplink to a network destination, the UE 102 can use SDT procedures to send the small data payload to a base station via one or more DRBs associated with an RRC connection while the UE 102 remains in the RRC Inactive state. As another example, as described further below, if the UE 102 is an MT device that is a destination for a small data payload sent by a network source to the UE 102, the UE 102 can use SDT procedures to receive the small data payload from a base station via one or more DRBs associated with an RRC connection while the UE 102 remains in the RRC Inactive state.

Network elements may periodically or intermittently send small data payloads, such as the small data payload 108 shown in FIG. 1, to the UE 102 when the UE 102 is a MT device. The small data payloads can be associated with relatively small amounts of data, such as amounts of data that are equal to or under a threshold size. The threshold size for the small data payloads can, for example, be configured to be 50 bytes, 100 bytes, or any other size.

As an example, the small data payload 108 can be a small amount of data associated with an instant message that is to be delivered to an instant messaging client executing on the UE 102. As other examples, the small data payload 108 can be a small amount of data associated with a push notification for an application executing on the UE 102, a heartbeat message configured to keep an application on the UE 102 active, a small amount of sensor data or other information that is to be delivered to the UE 102, and/or any type of data payload with a size that is equal to or less than the threshold size.

The UE 102 may receive such small data payloads from one or more sources, such as application servers or other network elements, on a periodic or intermittent basis. For example, an application server may send a series of heartbeat messages associated with a particular application to the UE 102 on a regular or irregular basis. Each of those heartbeat messages may be small data payloads, such as data payloads of one byte, two bytes, four bytes, or any other size that is equal to or less than the threshold size.

When an application server or other network element attempts to send the small data payload 108 to the UE 102 via the telecommunication network, one or more elements of the core network 106, such as a User Plane Function (UPF) and/or an Access and Mobility Management Function (AMF), can notify the base station 104 that the small data payload 108 is available for the UE 102, and/or provide the small data payload 108 to the base station 104. When the base station 104 is notified about the small data payload 108, and/or receives the small data payload 108, the base station 104 can send a paging message 110 addressed to the UE 102. For example, the base station 104 can broadcast the paging message 110, but include an identifier of the UE 102 within the paging message 110 to indicate that at least a portion of the paging message 110 is associated with the UE 102. For example, the identifier of the UE 102 in the paging message 110 may be an Inactive Radio Network Temporary Identifier (I-RNTI) associated with the UE 102.

The portion of the paging message 110 associated with the UE 102 can include an MT-SDT paging cause 112. The MT-SDT paging cause 112 can notify the UE 102 that there is a pending small data payload available for the UE 102, which the UE 102 can obtain via SDT procedures.

A paging message sent by a base station can include a "PagingCause" field that can hold one of a set of possible values indicating why the UE 102 is being paged by the base station. For example, if a base station is paging the UE 102 due to an incoming voice call addressed to the UE 102, the "PagingCause" field of a paging message may have a "voice" value that prompts the UE 102 to move to the RRC Connected state to answer the incoming voice call.

However, the MT-SDT paging cause 112 in the paging message 110 can be a particular value for the "PagingCause" field, such as "mt-SDT," that signifies to the UE 102 that there is a small data payload available for the UE 102. Accordingly, based on the MT-SDT paging cause 112 in the paging message 110, the UE 102 can determine to use SDT procedures to receive the small data payload while the UE 102 remains in the RRC Inactive state, instead of responding to the paging message 110 by moving to the RRC Connected state.

In some examples, different base stations, such as a group of base stations in a tracking area where the UE 102 last connected to a base station, may be notified about the small data payload 108 and/or receive the small data payload 108. Accordingly, in these examples, different base stations can attempt to send the paging message 110 that includes the MT-SDT paging cause 112 to the UE 102.

As an example, the base station 104 and/or other base stations that receive or are notified about the small data payload 108 for the UE 102 can broadcast the paging message 110, including the MT-SDT paging cause 112, in association with one or more cells of the base stations. The paging message 110 for the UE 102 may include one or more identifiers of the UE 102, such as an I-RNTI. The UE 102, while in the RRC Inactive state, can receive data broadcast by one or more base stations. The UE 102 can determine whether the broadcast data includes a paging message addressed to the UE 102, such as the paging message 110 that includes the MT-SDT paging cause 112. For example, if the UE 102 is in the RRC Inactive state, the UE 102 may nevertheless periodically wake to receive data being broadcast from one or more base stations. The UE 102 can analyze the received broadcast data to determine if the data includes a paging message addressed the UE 102, such as the paging message 110.

If the UE 102 receives the paging message 110 and determines that a portion of the paging message 110 is addressed to the UE 102, the UE 102 can determine that the portion of the paging message 110 associated with the UE 102 includes the MT-SDT paging cause 112 instead of a different paging cause. For example, the UE 102 can review the "PagingCause" field of the portion of the paging message addressed to the UE 102, and determine that the value of the "PagingCause" field is the MT-SDT paging cause 112 instead of a "voice" paging cause or any other type of paging cause. By determining that the portion of the paging message 110 associated with the UE 102 includes the MT-SDT paging cause 112, the UE 102 can determine that the UE 102 should respond to the paging message 110 using SDT procedures and while remaining in the RRC Inactive state, instead of responding to the paging message by switching from the RRC Inactive state to the RRC Connected state.

For example, to use SDT procedures to respond to the paging message 110 that includes the MT-SDT paging cause, the UE 102 can send an RRC resume request 114 to the base station 104. The UE 102 can send the RRC resume request 114 to the base station 104 while the UE 102 remains in the RRC Inactive state.

The RRC resume request 114 can include an MT-SDT indicator 116. The MT-SDT indicator 116 can indicate to the base station 104 that the UE 102 is requesting to use SDT procedures to resume a previously-established RRC connection to receive the small data payload 108 while the UE 102 remains in the RRC Inactive state. The presence of the MT-SDT indicator 116 can, for example, indicate to the base station 104 that the UE 102 is not requesting a resumption of the RRC connection as part of a change by the UE 102 from the RRC Inactive state to the RRC Connected state.

In some examples, the MT-SDT indicator 116 can be a particular value of a "ResumeCause" field of the RRC resume request 114, such as "mt-Access-SDT," that signifies to the base station 104 that the UE 102 is requesting to use SDT procedures to receive a small data payload while the UE 102 remains in the RRC Inactive state. Such a value of the "ResumeCause" field associated with the MT-SDT indicator 116, such as "mt-Access-SDT," can be distinct from other possible values of the "ResumeCause" field that are associated with other types of communication sessions or data transfers. For instance, a possible value of the "ResumeCause" field may be "mt-Access," but the "mt-Access" value of the "ResumeCause" field may be associated with an answer to a paging message for general types of data and/or communications sessions, and therefore may not indicate that the UE 102 is an MT device that is requesting to use SDT procedures to receive a small data payload while the UE 102 remains in the RRC Inactive state.

In other examples, the MT-SDT indicator 116 can be a particular value of an uplink payload portion of the RRC resume request 114 that signifies to the base station 104 that the UE 102 is requesting to use SDT procedures to receive a small data payload while the UE 102 remains in the RRC Inactive state. For example, the MT-SDT indicator 116 may be a value of "0" or "−1" of the uplink payload portion of the RRC resume request 114. For MO-SDT procedures in which a UE is an MO device that is resuming an RRC connection to send a small data payload uplink via the RRC connection, the UE can indicate a positive value in the uplink payload portion of the RRC resume request 114. In such MO-SDT procedures, the positive value of the uplink small data payload in the uplink payload portion of the RRC resume request 114 can signify to the base station 104 that the UE is requesting to use SDT procedures to send a small data payload while the UE 102 remains in the RRC Inactive state. Here however, when the UE 102 is an MT device and is responding to the paging message 110 that includes the MT-SDT paging cause 112, the UE 102 can set the uplink payload portion of the RRC resume request 114 to a different non-positive value, such as "0" or "−1," to indicate that the UE is an MT device that is responding to a paging message and is requesting to use SDT procedures to receive a small data payload while the UE 102 remains in the RRC Inactive state.

When the base station 104 receives the RRC resume request 114, the base station 104 can use SDT procedures to send the small data payload 108 to the UE 102 via the established RRC connection while the UE 102 is in the RRC Inactive state. For example, in response to the RRC resume request 114, the base station 104 may return an RRC resume message to the UE 102 that identifies one or more bearers, such as one or more DRBs, associated with the established RRC connection that are being resumed to transmit the small data payload 108 to the UE 102. The base station 104 can accordingly transfer the small data payload 108 to the UE 102 via the one or more resumed DRBs, identified in the RRC resume message, while the UE 102 remains in the RRC Inactive state.

After or along with sending the small data payload 108 to the UE 102, the base station 104 may also send the UE 102 an RRC release message that includes a suspend indication. The suspend indication in the RRC release message can indicate that the RRC connection is suspended and is not being fully released, and thus cause the UE 102 to remain in the RRC Inactive state instead of moving to the RRC Idle state. Accordingly, because the UE 102 can continue to be in the RRC Inactive state, the UE 102 can be prepared to use SDT procedures again, for instance if another small data payload is later transmitted to the UE 102 and the UE 102 receives another paging message with the MT-SDT paging cause 112.

In some examples, the base station that receives the RRC resume request 114 from the UE 102 can be the last base station that served the UE 102. Accordingly, the base station can use stored AS context information associated with the suspended RRC connection to transmit the small data payload 108 to the UE 102.

In other examples, the base station that receives the RRC resume request 114 from the UE 102 may not be the last base station that served the UE 102. Accordingly, in these examples, the base station can retrieve stored AS context information associated with the suspended RRC connection from the base station that last served the UE 102, and use the retrieved AS context information associated with the suspended RRC connection to transmit the small data payload 108 to the UE 102. In some examples, the last serving base station (the current anchor base station for the UE 102) may determine to relocate AS context information associated with the UE 102 to the base station that received the RRC resume request 114 via "SDT with UE context relocation" operations, such that the base station that received the RRC resume request 114 becomes the new anchor base station for the UE 102. In other examples, the last serving base station may determine to continue to be the anchor base station for the UE 102 by keeping the AS context information associated with the UE 102 via "SDT without UE context relocation" operations.

In some examples, the SDT procedures initiated by the UE 102 in response to the paging message 110 that includes the MT-SDT paging cause 112 can be performed via a Random Access Channel (RACH) procedure. For instance, the SDT procedures can be 4-step or 2-step Random Access Small Data Transmission (RA-SDT) procedures, as discussed further below with respect to FIG. 3 and FIG. 4. Such RA-SDT procedures can be performed with UE context relocation or without UE context relocation, as described above. In other examples, the SDT procedures can be Configured Grant Small Data Transmission (CG-SDT) procedures, as discussed further below with respect to FIG. 5. The UE 102 may determine to use 4-step RA-SDT procedures, 2-step RA-SDT procedures, or CG-SDT procedures in response to the paging message 110 that includes the MT-SDT paging cause 112 based on a configuration of the UE 102 and/or how a previously-established RRC connection with the base station 104 was suspended.

Overall, as shown in FIG. 1, the base station 104 can include the MT-SDT paging cause 112 in the paging message 110 to indicate to the UE 102 that the small data payload 108 is available for the UE 102 and can be obtained via SDT procedures. Based on the MT-SDT paging cause 112 in the paging message 110, the UE 102 can determine to respond to the paging message 110 by using SDT procedures to obtain the small data payload 108 while remaining in the RRC Inactive state and without moving to the RRC Connected state.

Figure 2:
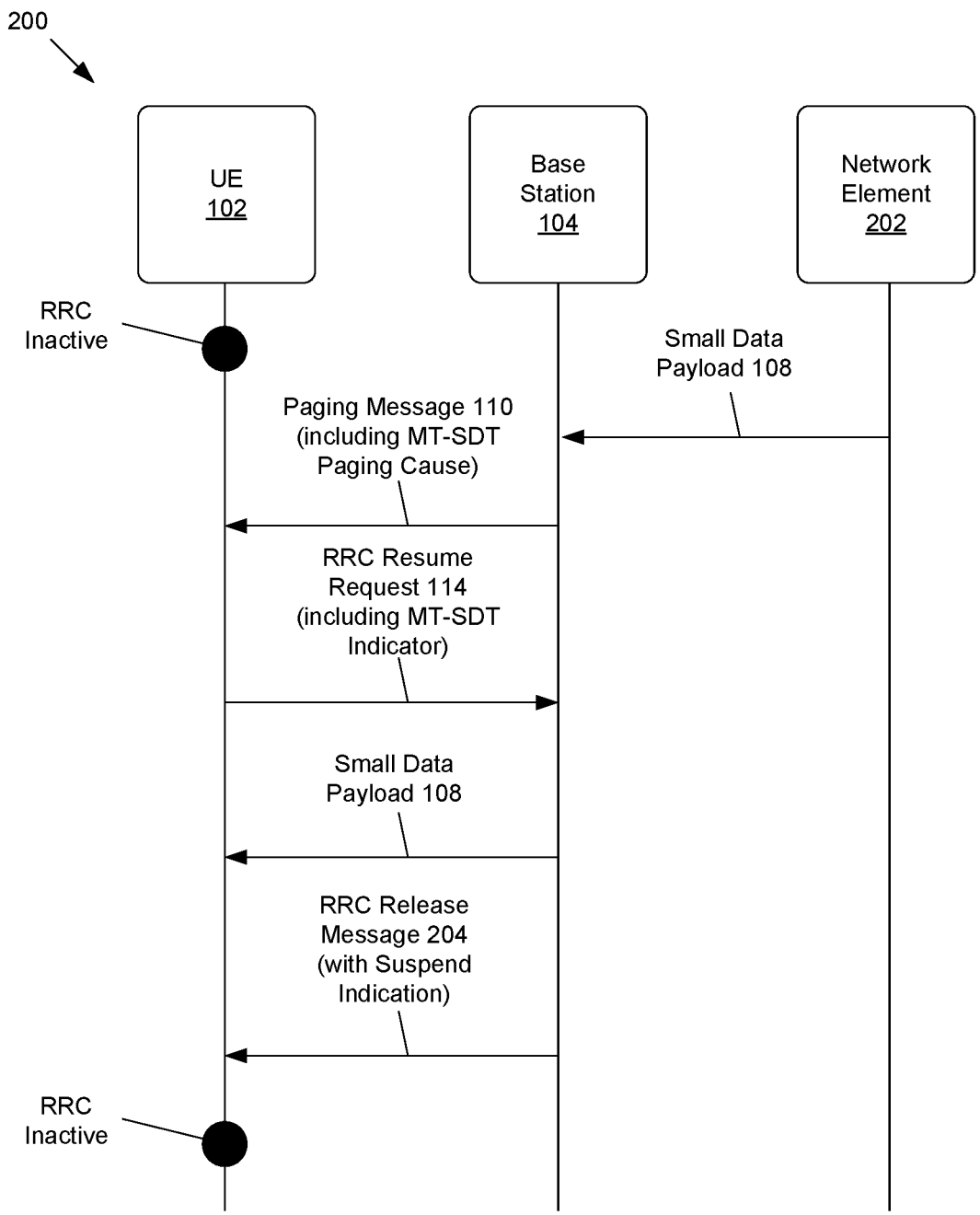
FIG. 2 shows a first sequence diagram of a general example sequence of messages that can be used to page the UE and prompt the UE to use Small Data Transmission (SDT) procedures to obtain a small data payload while remaining in a Radio Resource Control (RRC) Inactive state.

FIG. 2 shows a first sequence diagram 200 of a general example sequence of messages that can be used to page the UE 102 and prompt the UE 102 to use SDT procedures to obtain the small data payload 108 while remaining in the RRC Inactive state. As shown in FIG. 2, a network element 202, such as an application server, element of the core network 106, or other network element can provide the small data payload 108 for the UE 102 to the base station 104 and/or notify the base station 104 that the small data payload 108 is being sent to the UE 102. The UE 102 can be in the RRC Inactive state, for instance because a previously-established RRC connection has been suspended.

When the base station 104 receives the small data payload 108, and/or is notified about the small data payload 108, the base station 104 can send the paging message 110 to the UE 102. For example, the base station 104 can include an identifier of the UE 102, such as an I-RNTI, in the paging message 110, and can broadcast the paging message 110. The base station 104 can also include the MT-SDT paging cause 112 in the paging message 110, for example in a portion of the paging message 110 that is addressed to the UE 102. As discussed above, the MT-SDT paging cause 112 can be a particular value of a "PagingCause" field, such as "mt-SDT." The MT-SDT paging cause 112 in the paging message 110 can signify, to the UE 102, that the UE 102 is being paged because a small data payload is available for the UE 102, and that the UE 102 can obtain the small data payload via SDT procedures while the UE 102 remains in the RRC Inactive state.

When the UE 102 receives the paging message 110, the UE 102 can determine based on MT-SDT paging cause 112 that the small data payload 108 is available for the UE 102, and that the UE 102 can obtain the small data payload via SDT procedures. Accordingly, the UE 102 can send the RRC resume request 114 to the base station 104 in response to the paging message 110. The RRC resume request 114 can include the MT-SDT indicator 116, such as a particular value of a "ResumeCause" field or an uplink payload portion of the RRC resume request 114, which indicates a request to use MT-SDT procedures.

In response to the RRC resume request 114, the base station 104 can send the small data payload 108 to the UE 102 via the previously-suspended RRC connection. For example, after receiving the RRC resume request 114, the base station 104 can send an RRC resume message to the UE 102 that identifies one or more DRBs associated with the RRC connection that are being resumed, and can send the small data payload 108 to the UE 102 via the one or more resumed DRBs. At this point, the UE 102 can still be in the RRC Inactive state. The base station 104 can also send the UE 102 an RRC release message 204 that includes a suspend indication. The suspend indication in the RRC release message 204 can indicate that the RRC connection is suspended and is not being fully released, and thus cause the UE 102 to remain in the RRC Inactive state instead of moving to the RRC Idle state. In some examples, the base station 104 can send the RRC resume message, the small data payload 108, and/or the RRC release message as separate messages. In other examples, the base station 104 can send the small data payload 108 along with, or inside, the RRC resume message. In still other examples, the base station 104 can package the RRC resume message, the small data payload 108, and the RRC release message 204 together.

Figure 3:
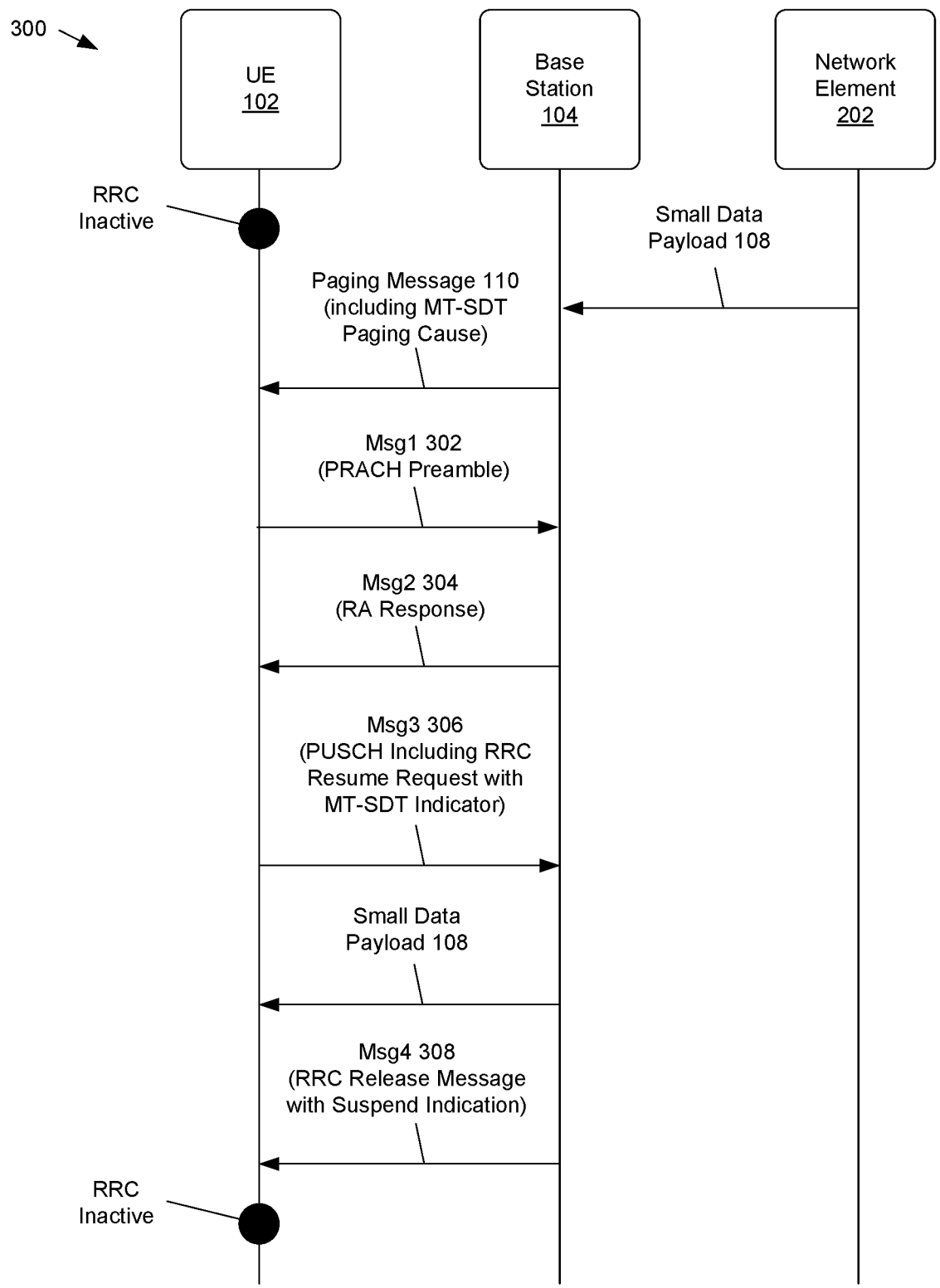
FIG. 3 shows a second sequence diagram of an example message sequence, associated with 4-step Random Access Small Data Transmission (RA-SDT) procedures, that can be initiated by a paging message from the base station that includes a Mobile Terminating Small Data Transmission (MT-SDT) paging cause.
Figure 4:
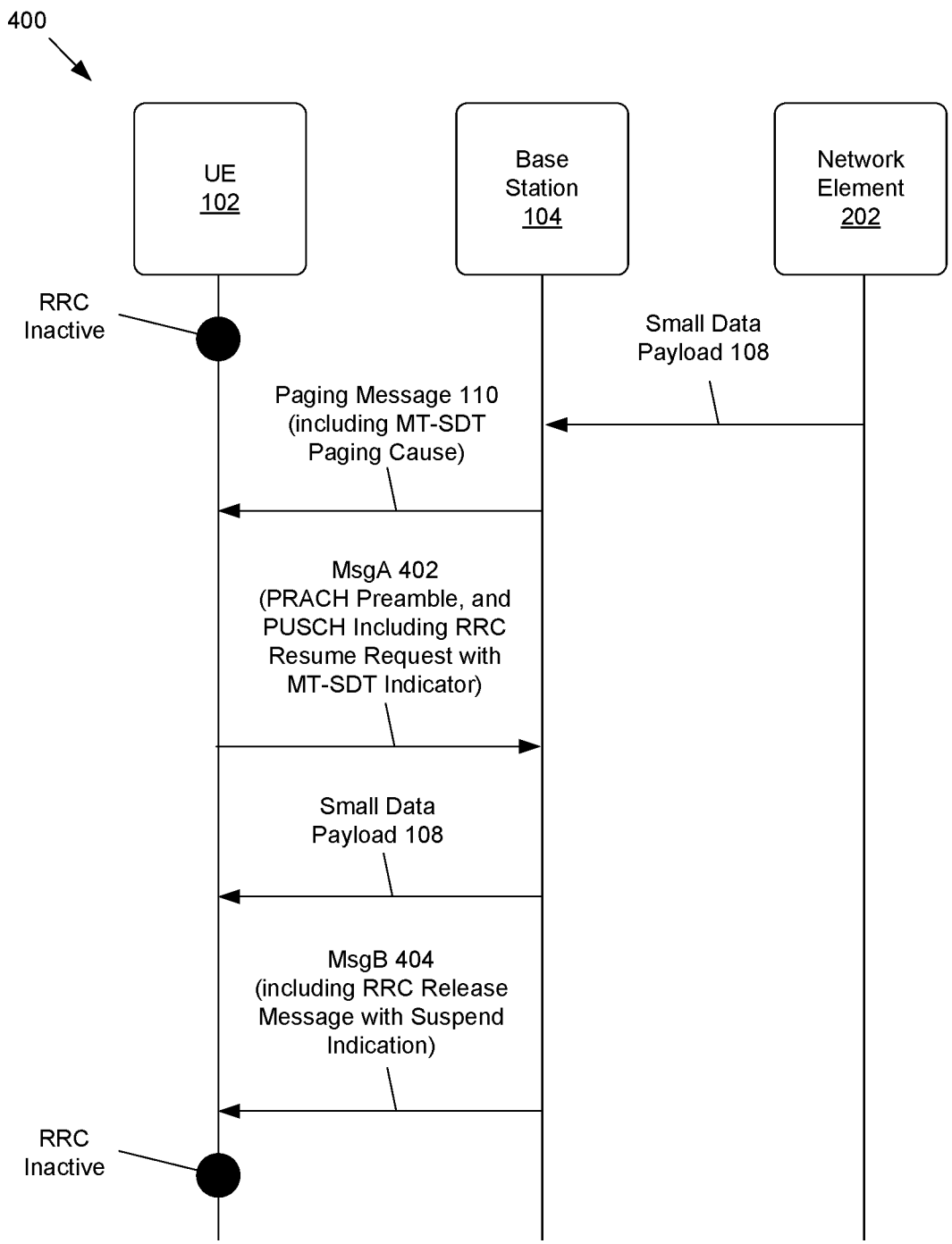
FIG. 4 shows a third sequence diagram of an example message sequence, associated with 2-step RA-SDT procedures, that can be initiated by the paging message that includes the MT-SDT paging cause.
Figure 5:
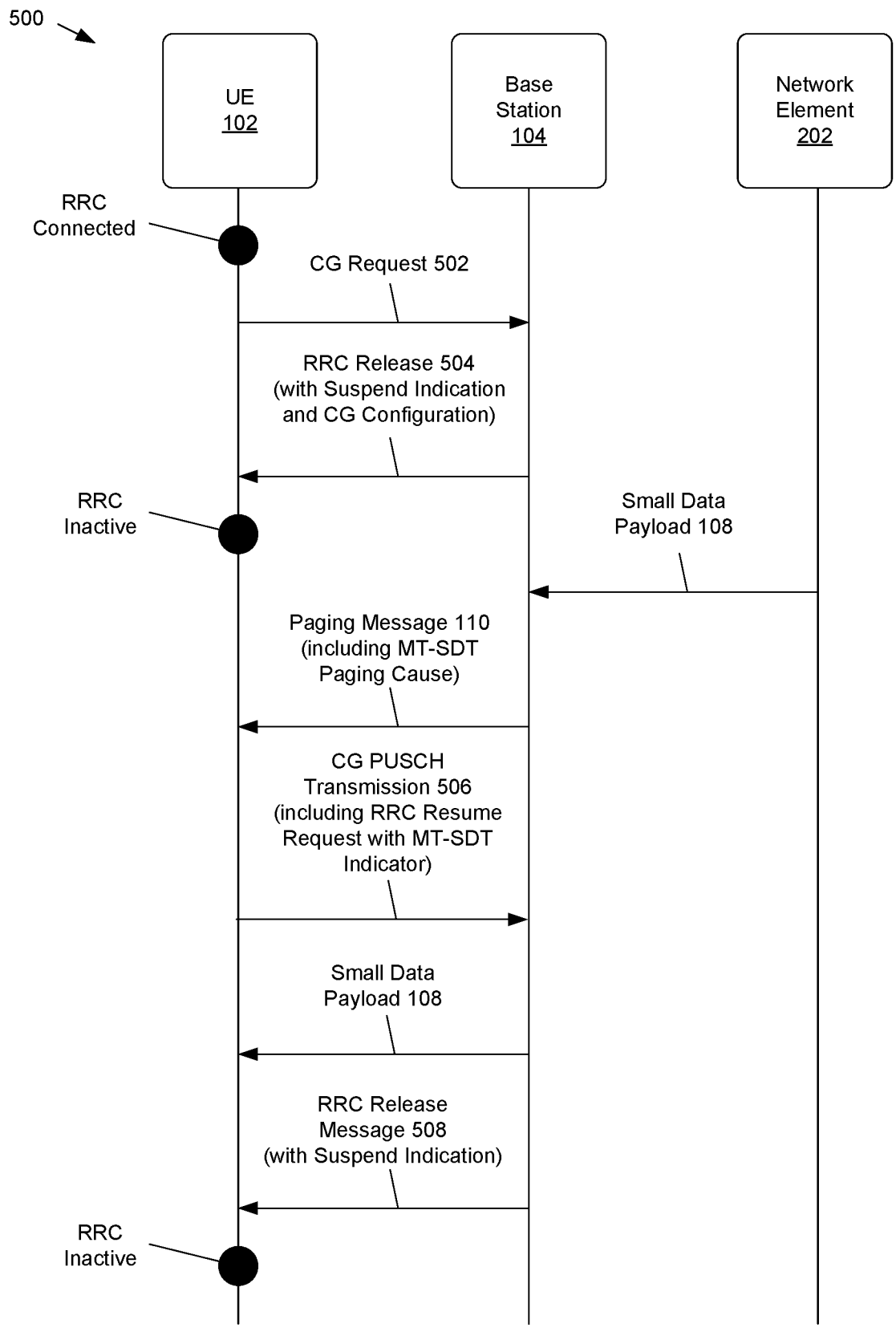
FIG. 5 shows a fourth sequence diagram of an example message sequence, associated with Configured Grant Small Data Transmission (CG-SDT) procedures, that can be initiated by the paging message that includes the MT-SDT paging cause.

Although FIG. 2 shows a general example sequence of messages that can be associated with SDT procedures initiated by the paging message 110 that includes the MT-SDT paging cause 112, FIGS. 3-5 show examples of message sequences associated with different types of SDT procedures. For example, FIG. 3 shows an example message sequence associated with 4-step RA-SDT procedures, FIG. 4 shows an example message sequence associated with 2-step RA-SDT procedures, and FIG. 5 shows an example message sequence associated with CG-SDT procedures.

FIG. 3 shows a second sequence diagram 300 of an example message sequence, associated with 4-step RA-SDT procedures, that can be initiated by the paging message 110 that includes the MT-SDT paging cause 112. The 4-step RA-SDT procedures can be performed with UE context relocation or without UE context relocation, as described above.

Similar to FIG. 2, the network element 202 can provide the small data payload 108 for the UE 102 to the base station 104, and/or notify the base station 104 that the small data payload 108 is being sent to the UE 102. The UE 102 can be in the RRC Inactive state, for instance because a previously-established RRC connection has been suspended. When the base station 104 receives the small data payload 108, and/or is notified about the small data payload 108, the base station 104 can send the paging message 110 that includes the MT-SDT paging cause 112 to the UE 102. As discussed above, the MT-SDT paging cause 112 can be a particular value of a "PagingCause" field, such as "mt-SDT." When the UE 102 receives the paging message 110, the UE 102 can determine based on MT-SDT paging cause 112 that a small data payload is available for the UE 102.

As shown in FIG. 3, the UE 102 can determine to use 4-step RA-SDT procedures to obtain the small data payload. For example, the UE 102 may be pre-configured to use 4-step RA-SDT procedures instead of the 2-step RA-SDT procedures discussed below with respect to FIG. 4, and/or may determine that CG-SDT procedures discussed below with respect to FIG. 5 are not available.

In the 4-step RA-SDT procedure, the UE 102 can transmit a first message 302 (known as "Msg1" in the 4-step RA-SDT procedure) to the base station 104 in response to the paging message 110 that includes the MT-SDT paging cause 112. The first message 302 (Msg1) can include a Physical Random Access Channel (PRACH) preamble. In response to the first message 302, the base station 104 can return a second message 304 (known as "Msg2" in the 4-step RA-SDT procedure) to the UE 102. The second message 304 (Msg2) can include a Random Access Response from the base station 104.

The UE 102 can respond to the second message 304 (Msg2) by sending a third message 306 (known as "Msg3" in the 4-step RA-SDT procedure) to the base station 104. The third message 306 (Msg3) can include Physical Uplink Shared Channel (PUSCH) information. As shown in FIG. 3, the UE 102 can send the RRC resume request 114, including the MT-SDT indicator 116, via the third message 306 (Msg3), for example in or along with the PUSCH information. As discussed above, the MT-SDT indicator 116 may be a particular value of a "ResumeCause" field or an uplink payload portion of the RRC resume request 114, which indicates a request to use MT-SDT procedures. The RRC resume request 114, including the MT-SDT indicator 116, in the third message 306 (Msg3) can therefore indicate to the base station 104 that the UE 102 is requesting to use SDT procedures to obtain the small data payload 108 while the UE 102 remains in the RRC Inactive state.

The base station 104 can respond to the third message 306 (Msg3) by sending the small data payload 108 to the UE 102. As shown in FIG. 3, because the RRC resume request 114 in the third message 306 (Msg3) included the MT-SDT indicator 116, the base station 104 can use SDT procedures to send the small data payload 108 to the UE 102. For example, after receiving the RRC resume request 114 in the third message 306 (Msg3), the base station 104 can send an RRC resume message to the UE 102 that identifies one or more DRBs associated with the RRC connection that are being resumed, and can send the small data payload 108 to the UE 102 via the one or more resumed DRBs while the UE 102 is in the RRC Inactive state.

The base station 104 can also send a fourth message 308 (known as "Msg4" in the 4-step RA-SDT procedure) to the UE 102. The base station 104 can also include an RRC release message, with a suspend indication, in the fourth message 308 (Msg4) sent to the UE 102. The suspend indication, in the RRC release message sent via the fourth message 308 (Msg4), can indicate that the RRC connection is suspended and is not being fully released, and thus cause the UE 102 to remain in the RRC Inactive state instead of moving to the RRC Idle state.

In some examples in which 4-step RA-SDT procedures are used, the base station 104 can send the small data payload 108 to the UE 102 in a separate message prior to sending the fourth message 308 (Msg4), for instance after or along with an RRC resume message that identifies one or more DRBs that are being resumed to send the small data payload 108 to the UE 102 as shown in FIG. 3. In other examples, the base station 104 can include the small data payload 108 in the fourth message 308 (Msg4) sent to the UE 102.

FIG. 4 shows a third sequence diagram 400 of an example message sequence, associated with 2-step RA-SDT procedures, that can be initiated by the paging message 110 that includes the MT-SDT paging cause 112. The 2-step RA-SDT procedures can be performed with UE context relocation or without UE context relocation, as described above.

Similar to FIG. 2, the network element 202 can provide the small data payload 108 for the UE 102 to the base station 104, and/or notify the base station 104 that the small data payload 108 is being sent to the UE 102. The UE 102 can be in the RRC Inactive state, for instance because a previously-established RRC connection has been suspended. When the base station 104 receives the small data payload 108, and/or is notified about the small data payload 108, the base station 104 can send the paging message 110 that includes the MT-SDT paging cause 112 to the UE 102. As discussed above, the MT-SDT paging cause 112 can be a particular value of a "PagingCause" field, such as "mt-SDT." When the UE 102 receives the paging message 110, the UE 102 can determine based on MT-SDT paging cause 112 that a small data payload is available for the UE 102.

As shown in FIG. 4, the UE 102 can determine to use 2-step RA-SDT procedures to obtain the small data payload. For example, the UE 102 may be pre-configured to use 2-step RA-SDT procedures instead of the 4-step RA-SDT procedures discussed above with respect to FIG. 3, and/or may determine that CG-SDT procedures discussed below with respect to FIG. 5 are not available.

In the 2-step RA-SDT procedure, the UE 102 can transmit a first message 402 (known as "MsgA" in the 2-step RA-SDT procedure) to the base station 104 in response to the paging message 110 that includes the MT-SDT paging cause 112. The first message 402 (MsgA) can include a PRACH preamble and PUSCH information. As shown in FIG. 4, the RRC resume request 114 with the MT-SDT indicator 116 can be included by the UE 102 in the first message 402 (MsgA) in the 2-step RA-SDT procedure, for instance in or along with the PUSCH information. As discussed above, the MT-SDT indicator 116 may be a particular value of a "ResumeCause" field or an uplink payload portion of the RRC resume request 114, which indicates a request to use MT-SDT procedures. The RRC resume request 114, including the MT-SDT indicator 116, in the first message 402 (MsgA) of the 2-step RA-SDT procedure can therefore indicate to the base station 104 that the UE 102 is requesting to use SDT procedures to obtain the small data payload 108 while the UE 102 remains in the RRC Inactive state.

In response to the first message 402 (MsgA), the base station 104 can send the small data payload 108 to the UE 102. As shown in FIG. 4, because the RRC resume request 114 in the first message 402 (MsgA) included the MT-SDT indicator 116, the base station 104 can use SDT procedures to send the small data payload 108 to the UE 102. For example, after receiving the RRC resume request 114 in the first message 402 (MsgA), the base station 104 can send an RRC resume message to the UE 102 that identifies one or more DRBs associated with the RRC connection that are being resumed, and can send the small data payload 108 to the UE 102 via the one or more resumed DRBs while the UE 102 is in the RRC Inactive state.

The base station 104 can also send a second message 404 (known as "MsgB" in the 2-step RA-SDT procedure) to the UE 102. The second message 404 (MsgB) can include an RRC release message with a suspend indication. The suspend indication, in the RRC release message sent via the second message 404 (MsgB), can indicate that the RRC connection is suspended and is not being fully released, and thus cause the UE 102 to remain in the RRC Inactive state instead of moving to the RRC Idle state.

In some examples in which 2-step RA-SDT procedures are used, the base station 104 can send the small data payload 108 to the UE 102 in a separate message prior to sending the second message 404 (MsgB), for instance after or along with an RRC resume message that identifies one or more DRBs that are being resumed to send the small data payload 108 to the UE 102 as shown in FIG. 4. In other examples, the base station 104 can include the small data payload 108 in the second message 404 (MsgB) sent to the UE 102.

FIG. 5 shows a fourth sequence diagram 500 of an example message sequence, associated with CG-SDT procedures, that can be initiated by the paging message 110 that includes the MT-SDT paging cause 112. The CG-SDT procedures can be available if a configured grant (CG) configuration was requested from the base station 104 by the UE 102 while the UE 102 was in the RRC connected state. The CG configuration can be associated with reserved or pre-configured PUSCH resources, and may thus be associated with lower latencies, lower signaling volume, and/or lower power consumption of the UE 102 relative to 4-step RA-SDT procedures or 2-step RA-SDT procedures.

For example, as shown in FIG. 5, when the UE 102 is in the RRC Connected state and an RRC connection is active and established between the UE 102 and the base station 104, the UE 102 can send a CG request 502 to the base station 104. The CG request 502 can be a request for a CG configuration. In response to the CG request 502, the base station 104 can return an RRC release message 504 to the UE 102. The RRC release message 504 can include a suspend indicator, which indicates that the RRC connection is suspended and is not being fully released, and thus causes the UE 102 to change from the RRC Connected state to the RRC Inactive state as shown in FIG. 5. The RRC release message 504 can also include the CG configuration requested by the UE 102 via the CG request 502. The CG configuration sent in the RRC release message 504 can be specific to the UE 102, and can include allocated PUSCH resources and other elements.

Similar to FIG. 2, the network element 202 can provide the small data payload 108 for the UE 102 to the base station 104, and/or notify the base station 104 that the small data payload 108 is being sent to the UE 102. At this point, the UE 102 can be in the RRC Inactive state due to the RRC release message 504.

When the base station 104 receives the small data payload 108, and/or is notified about the small data payload 108, the base station 104 can send the paging message 110 that includes the MT-SDT paging cause 112 to the UE 102. As discussed above, the MT-SDT paging cause 112 can be a particular value of a "PagingCause" field, such as "mt-SDT." When the UE 102 receives the paging message 110, the UE 102 can determine based on MT-SDT paging cause 112 that a small data payload is available for the UE 102.

As shown in FIG. 5, because the UE 102 received the CG configuration in the RRC release message 504, the UE 102 can determine that CG-SDT procedures are available. The UE 102 may therefore determine to use the CG-SDT procedures to obtain the small data payload, instead of the 4-step RA-SDT procedures or 2-step RA-SDT procedures discussed above with respect to FIG. 3 and FIG. 4.

In the CG-SDT procedure, the UE 102 can send a CG PUSCH transmission 506 to the base station 104 in response to the paging message 110 that includes the MT-SDT paging cause 112. As shown in FIG. 5, the RRC resume request 114 with the MT-SDT indicator 116 can be included by the UE 102 in the CG PUSCH transmission 506 in the CG-SDT procedure. As discussed above, the MT-SDT indicator 116 may be a particular value of a "ResumeCause" field or an uplink payload portion of the RRC resume request 114, which indicates a request to use MT-SDT procedures. The RRC resume request 114, including the MT-SDT indicator 116, in the CG PUSCH transmission 506 of the CG-SDT procedure can therefore indicate to the base station 104 that the UE 102 is requesting to use SDT procedures to obtain the small data payload 108 while the UE 102 remains in the RRC Inactive state.

In response to the CG PUSCH transmission 506, the base station 104 can send the small data payload 108 to the UE 102. As shown in FIG. 4, because the RRC resume request 114 in the CG PUSCH transmission 506 included the MT-SDT indicator 116, the base station 104 can use SDT procedures to send the small data payload 108 to the UE 102. For example, after receiving the RRC resume request 114 in the CG PUSCH transmission 506, the base station 104 can send an RRC resume message to the UE 102 that identifies one or more DRBs associated with the RRC connection that are being resumed, and can send the small data payload 108 to the UE 102 via the one or more resumed DRBs while the UE 102 is in the RRC Inactive state.

The base station 104 can also send an RRC release message 508, including a suspend indication, to the UE 102. The suspend indication, in the RRC release message 508 sent to the UE 102, can indicate that the RRC connection is suspended and is not being fully released, and thus cause the UE 102 to remain in the RRC Inactive state instead of moving to the RRC Idle state.

In some examples in which CG-SDT procedures are used, the base station 104 can send the small data payload 108 to the UE 102 in a separate message prior to sending the RRC release message 508, for instance after or along with an RRC resume message that identifies one or more DRBs that are being resumed to send the small data payload 108 to the UE 102 as shown in FIG. 5. In other examples, the base station 104 can include the small data payload 108 in the RRC release message 508 sent to the UE 102.

Overall, as shown in the example message sequences shown in FIGS. 2-5, the UE 102 can receive the paging message 110 with the MT-SDT paging cause 112 while the UE 102 is in the RRC Inactive state. The paging message 110, including the MT-SDT paging cause 112, can be sent by the base station 104 when the small data payload 108 is available for the UE 102. The UE 102 can respond to the paging message 110 that includes the MT-SDT paging cause 112 by initiating an SDT procedure with the RRC resume request 114 that includes the MT-SDT indicator 116. In response to the RRC resume request 114 that includes the MT-SDT indicator 116, the base station 104 can send the small data payload 108 to the UE 102, and can also use a suspend indication in an RRC release message to cause the UE 102 to remain in the RRC Inactive state. Accordingly, when the small data payload 108 is available for the UE 102, the paging message 110 with the MT-SDT paging cause 112 can cause the UE 102 can obtain the small data payload 108 without the UE 102 changing from the RRC Inactive state to the RRC Connected state.

Example Architecture

Figure 6:
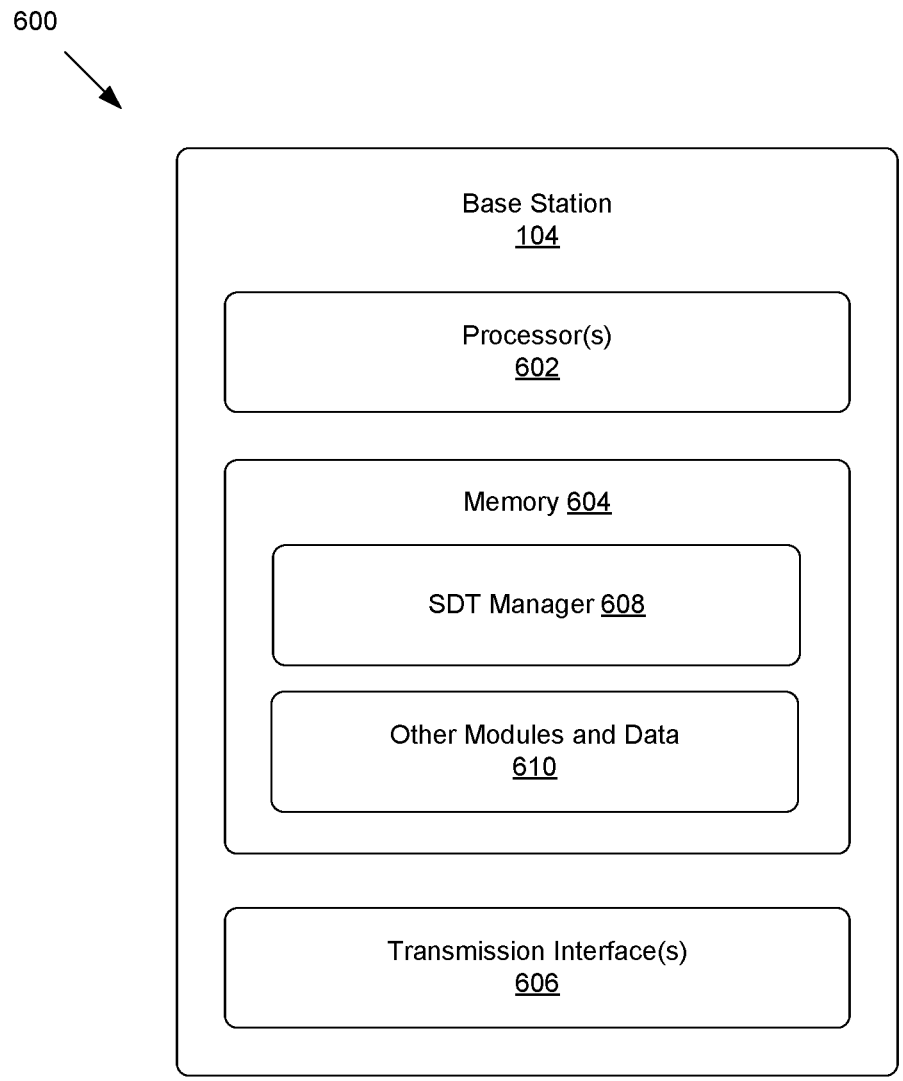
FIG. 6 shows an example of a system architecture for the base station.

FIG. 6 shows an example 600 of a system architecture for the base station 104, in accordance with various examples. The base station 104 can be a 5G gNB, an LTE eNB, or other type of base station as described above. As shown, the base station 104 can include processor(s) 602, memory 604, and transmission interfaces 606.

The processor(s) 602 may be a central processing unit (CPU), or any other type of processing unit. Each of the one or more processor(s) 602 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 602 may also be responsible for executing all computer-executable instructions and/or computer applications stored in the memory 604.

In various examples, the memory 604 can include system memory, which may be volatile (such as RAM), non-volatile (such as ROM, flash memory, etc.) or some combination of the two. The memory 604 can also include additional data storage devices (removable and/or non-removable) such as, for example, magnetic disks, optical disks, or tape. Memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD, or other optical storage, magnetic cassettes, magnetic tape, magnetic disk storage or other magnetic storage devices, or any other non-transitory medium which can be used to store the desired information and which can be accessed by the base station 104. Any such non-transitory computer-readable media may be part of the base station 104.

The memory 604 can store computer-readable instructions and/or other data associated with operations of the base station 104. For example, the memory 604 can store computer-readable instructions and/or other data associated with an SDT manager 608. When the small data payload 108 is available for the UE 102, the SDT manager 608 can be configured to generate and send the paging message 110 that includes, in at least a portion of the paging message 110 addressed to and/or associated with the UE 102, the MT-SDT paging cause 112. When the base station 104 receives the RRC resume request 114 that includes the MT-SDT indicator 116, the SDT manager 608 can be configured to transmit the small data payload 108 to the UE 102, and may also be configured to send an RRC release message with a suspend indicator that causes the UE 102 to remain in an RRC Inactive state. The memory 604 can also store other modules and data 610. The other modules and data 610 can be utilized by the base station 104 to perform or enable performing any action taken by the base station 104. The other modules and data 610 can include a platform, operating system, firmware, and/or applications, and data utilized by the platform, operating system, firmware, and/or applications.

The transmission interfaces 606 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with the UE 102, other base stations or RAN elements, elements of the core network 106, and/or other network elements, and can transmit data over such connections. For example, the transmission interfaces 606 can establish a connection with the UE 102 over an air interface. The transmission interfaces 606 can also support transmissions using one or more radio access technologies, such as 5G NR. The transmission interfaces 606 can also be used by the base station 104 to establish and/or suspend an RRC connection with the UE 102, send the paging message 110 that includes the MT-SDT paging cause 112, receive the RRC resume request 114 that includes the MT-SDT indicator, send the small data payload 108 to the UE 102, send an RRC release message that includes a suspend indicator, and/or to send or receive any other data.

Figure 7:
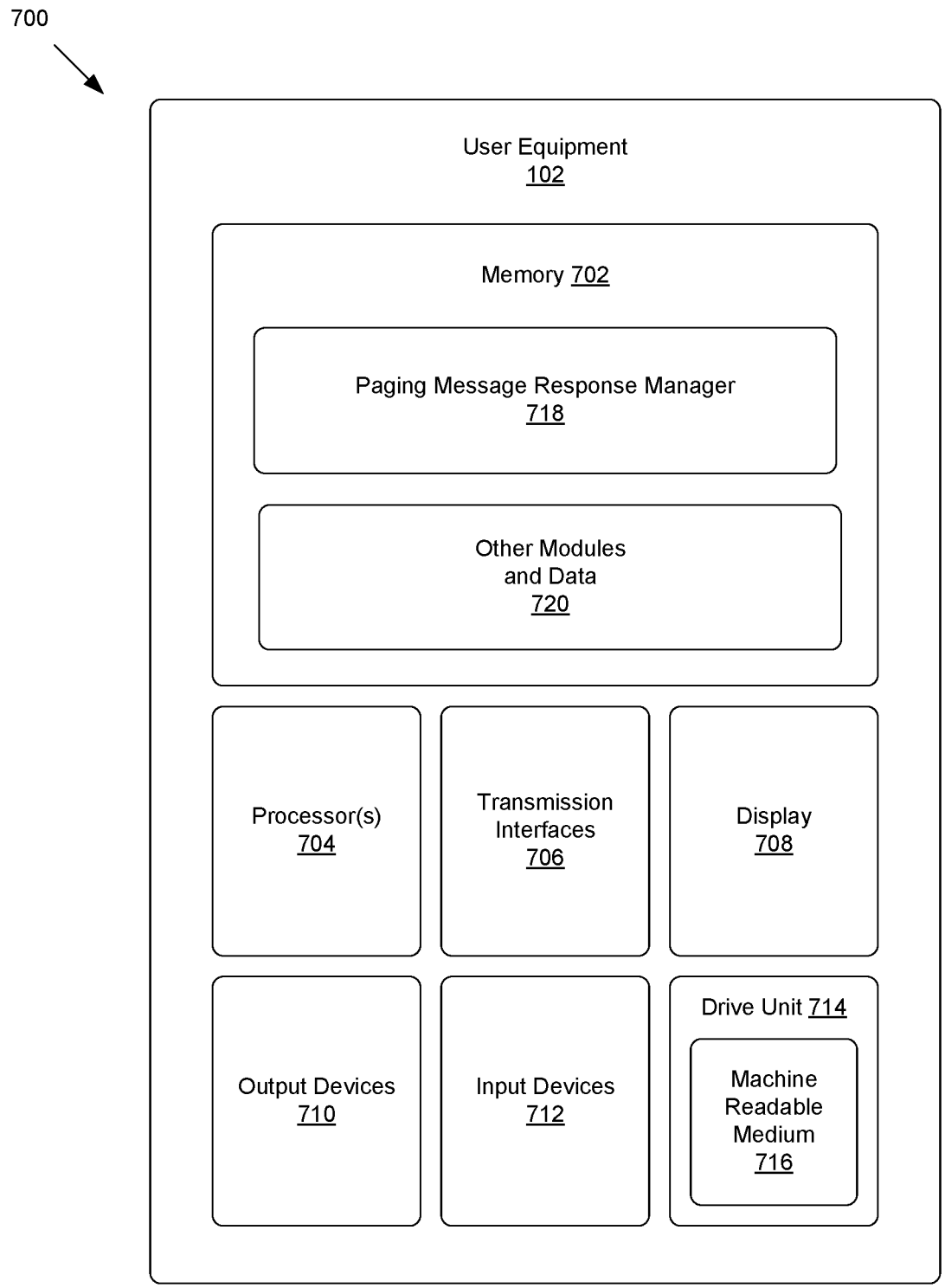
FIG. 7 shows an example of system architecture for the UE.

FIG. 7 shows an example 700 of system architecture for the UE 102, in accordance with various examples. The UE 102 can have at least one memory 702, processor(s) 704, transmission interfaces 706, a display 708, output devices 710, input devices 712, and/or a drive unit 714 including a machine readable medium 716.

In various examples, the memory 702 can include system memory, which may be volatile (such as RAM), non-volatile (such as ROM, flash memory, etc.) or some combination of the two. The memory 702 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The memory 702 can include one or more software or firmware elements, such as data and/or computer-readable instructions that are executable by the one or more processors 704. For example, the memory 702 can store computer-executable instructions and data associated with a paging message response manager 718. The paging message response manager 718 can be configured to evaluate a paging message addressed to the UE 102, and determine how the UE 102 is to respond to the paging message. For example, if the paging message has a "voice" paging cause due to an incoming voice call directed to the UE 102, the paging message response manager 718 may cause the UE 102 to switch to the RRC Connected state to respond to the paging message and answer the voice call. However, if the paging message includes the MT-SDT paging cause 112 described herein, the paging message response manager 718 can cause the UE 102 to use SDT procedures to respond to the paging message and to obtain a pending small data payload for the UE 102 without switching from the RRC Inactive state to the RRC Connected state. For instance, if the paging message includes the MT-SDT paging cause 112, the paging message response manager 718 can cause the UE 102 to send the RRC resume request 114 that includes the MT-SDT indicator 116 as described above. The memory 702 can also store other modules and data 720, which can be utilized by the UE 102 to perform or enable performing any action taken by the UE 102. The other modules and data 720 can include a platform, operating system, firmware, and/or applications, and data utilized by the platform, operating system, firmware, and/or applications.

In various examples, the processor(s) 704 can be a CPU, a graphics processing unit (GPU), or both CPU and GPU, or any other type of processing unit. Each of the one or more processor(s) 704 may have numerous ALUs that perform arithmetic and logical operations, as well as one or more CUs that extract instructions and stored content from processor cache memory, and then executes these instructions by calling on the ALUs, as necessary, during program execution. The processor(s) 704 may also be responsible for executing all computer applications stored in the memory 702, which can be associated with types of volatile (RAM) and/or nonvolatile (ROM) memory.

The transmission interfaces 706 can include transceivers, modems, interfaces, antennas, and/or other components that perform or assist in exchanging radio frequency (RF) communications with base stations of the access network, a Wi-Fi access point, or otherwise implement connections with one or more networks. The transmission interfaces 706 can be compatible with one or more radio access technologies, such as 5G NR radio access technologies and/or LTE radio access technologies. The transmission interfaces 706 can be used by the UE 102 to receive the paging message 110 that includes the MT-SDT paging cause 112, send the RRC resume request 114 that includes the MT-SDT indicator, receive the small data payload 108 from the base station 104, receive an RRC release message that includes a suspend indicator, and/or to send or receive any other data.

The display 708 can be a liquid crystal display or any other type of display commonly used in UEs. For example, the display 708 may be a touch-sensitive display screen, and can thus also act as an input device or keypad, such as for providing a soft-key keyboard, navigation buttons, or any other type of input.

The output devices 710 can include any sort of output devices known in the art, such as the display 708, speakers, a vibrating mechanism, and/or a tactile feedback mechanism. Output devices 710 can also include ports for one or more peripheral devices, such as headphones, peripheral speakers, and/or a peripheral display.

The input devices 712 can include any sort of input devices known in the art. For example, input devices 712 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 716 can store one or more sets of instructions, such as software or firmware, that embodies any one or more of the methodologies or functions described herein. The instructions can also reside, completely or at least partially, within the memory 702, processor(s) 704, and/or transmission interface(s) 706 during execution thereof by the UE 102. The memory 702 and the processor(s) 704 also can constitute machine readable media 716.

Example Operations

Figure 8:
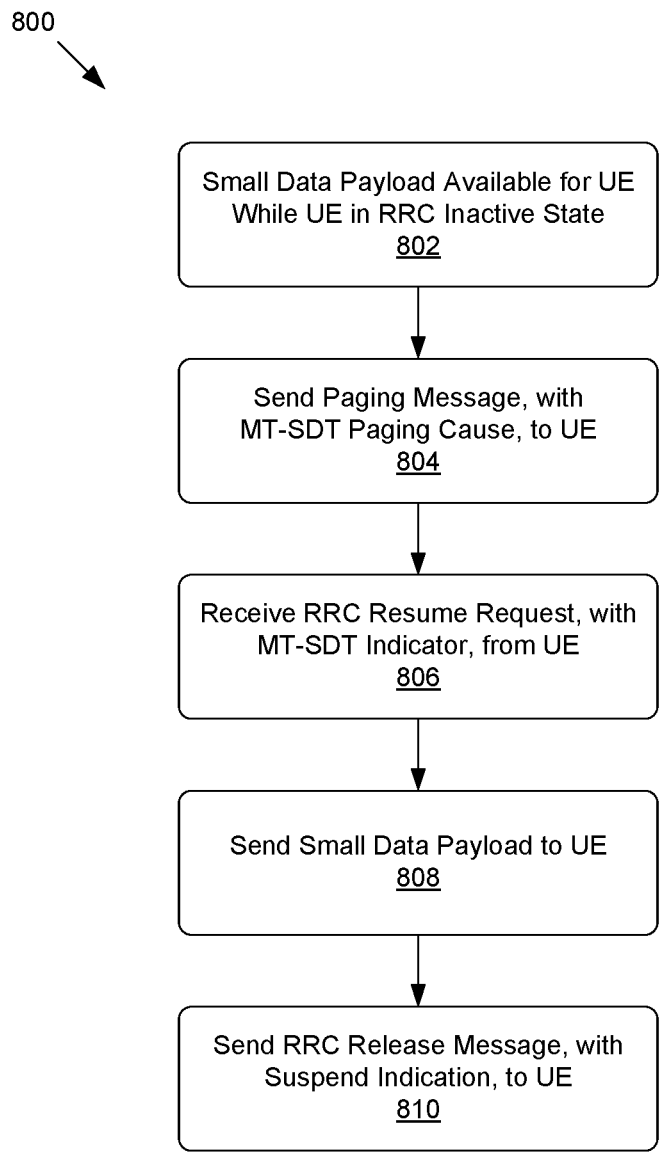
FIG. 8 shows a flowchart of an example method in which the base station can use the paging message, including the MT-SDT paging cause, to notify an MT UE about a small data payload that the UE can obtain via SDT procedures.

FIG. 8 shows a flowchart of an example method 800 in which the base station 104 can use the paging message 110, including the MT-SDT paging cause 112, to notify an MT UE about a small data payload that the UE 102 can obtain via SDT procedures. At block 802, the base station 104 can determine that the small data payload 108 is available for the UE 102 while the UE 102 is in the RRC Inactive state. For example, one or more network elements, such as an AMF and/or UPF in the core network 106, can notify the base station 104 about the small data payload 108 and/or provide the small data payload 108 to the base station 104. The UE 102 may be in the RRC Inactive state due to a suspension of a previously-established RRC connection, for instance based on an RRC release message with a suspend indication sent by the base station 104 or a different base station.

At block 804, in response to determining that the small data payload 108 is available for the UE 102 while the UE 102 is in the RRC Inactive state, the base station 104 can send the paging message 110 with the MT-SDT paging cause 112 to the UE 102. For example, the base station 104 can generate the paging message 110 by addressing at least a portion of the paging message 110 with an I-RNTI or other identifier of the UE 102, and including the MT-SDT paging cause 112 in the portion of the paging message 110 associated with the UE 102. As discussed above, the MT-SDT paging cause 112 can be a particular value of a "PagingCause" field, such as "mt-SDT." The base station 104 can broadcast the paging message 110, including the MT-SDT paging cause 112, such that the UE 102 can receive the paging message 110 if the UE 102 is within range of the base station 104.

At block 806, the base station 104 can receive the RRC resume request 114, including the MT-SDT indicator 116, from the UE 102 in response to the paging message 110. In some examples, the MT-SDT indicator 116 can be a particular value of a "ResumeCause" field of the RRC resume request 114 that is associated with MT-SDT procedures. In other examples, the MT-SDT indicator 116 can be a particular value of an uplink payload portion of the RRC resume request 114, such as "0" or "−1," that indicates a request for MT-SDT procedures.

At block 808, in response to receiving the RRC resume request 114 that includes the MT-SDT indicator 116 from the UE 102, the base station 104 can use SDT procedures to send the small data payload 108 to the UE 102 while the UE 102 remains in the RRC Inactive state. For example, after receiving the RRC resume request 114 at block 806, the base station 104 can send an RRC resume message to the UE 102 that identifies one or more DRBs associated with an RRC connection that are being resumed, and can send the small data payload 108 to the UE 102 via the one or more resumed DRBs while the UE 102 is in the RRC Inactive state.

The base station 104 can also, at block 810, send an RRC release message that includes a suspend indication to the UE 102. The suspend indication in the RRC release message can indicate that the RRC connection is suspended and is not being fully released, and thus cause the UE 102 to remain in the RRC Inactive state instead of moving to the RRC Idle state. In some examples, the base station 104 can send the small data payload at block 808 and send the RRC release message at block 810 as separate messages. In other examples, the base station 104 can send the small data payload at block 808 and send the RRC release message at block 810 as part of the same message sent to the UE 102.

In some example, multiple base stations may perform the operations of block 802 and block 804, while one of the base stations that receives the RRC resume request 114 from the base station 104 can perform the operations of blocks 806-810. For example, one or more network elements may notify multiple base stations, such as multiple base stations in a tracking area where the UE 102 was last connected to the telecommunication network, about the small data payload 108 at block 802. The multiple base stations can accordingly broadcast paging messages with portions addressed to the UE 102 that include the MT-SDT paging cause 112 at block 804. If the UE 102 receives one of the paging messages from a particular base station, the UE 102 can respond by sending the RRC resume request 114, including the MT-SDT indicator 116, to that particular base station. Accordingly, that particular base station can receive the RRC resume request 114 from the UE 102 at block 806, send the small data payload 108 to the UE 102 at block 808, and send the RRC release message with the suspend indication to the UE 102 at block 810. If the particular base station was not the last serving base station for the UE 102, the particular base station may nevertheless receive the RRC resume request 114 from the UE 102, send the small data payload 108 to the UE 102, and send the RRC release message with the suspend indication to the UE 102, for instance via RA-SDT procedures with UE context relocation or without UE context relocation.

Figure 9:
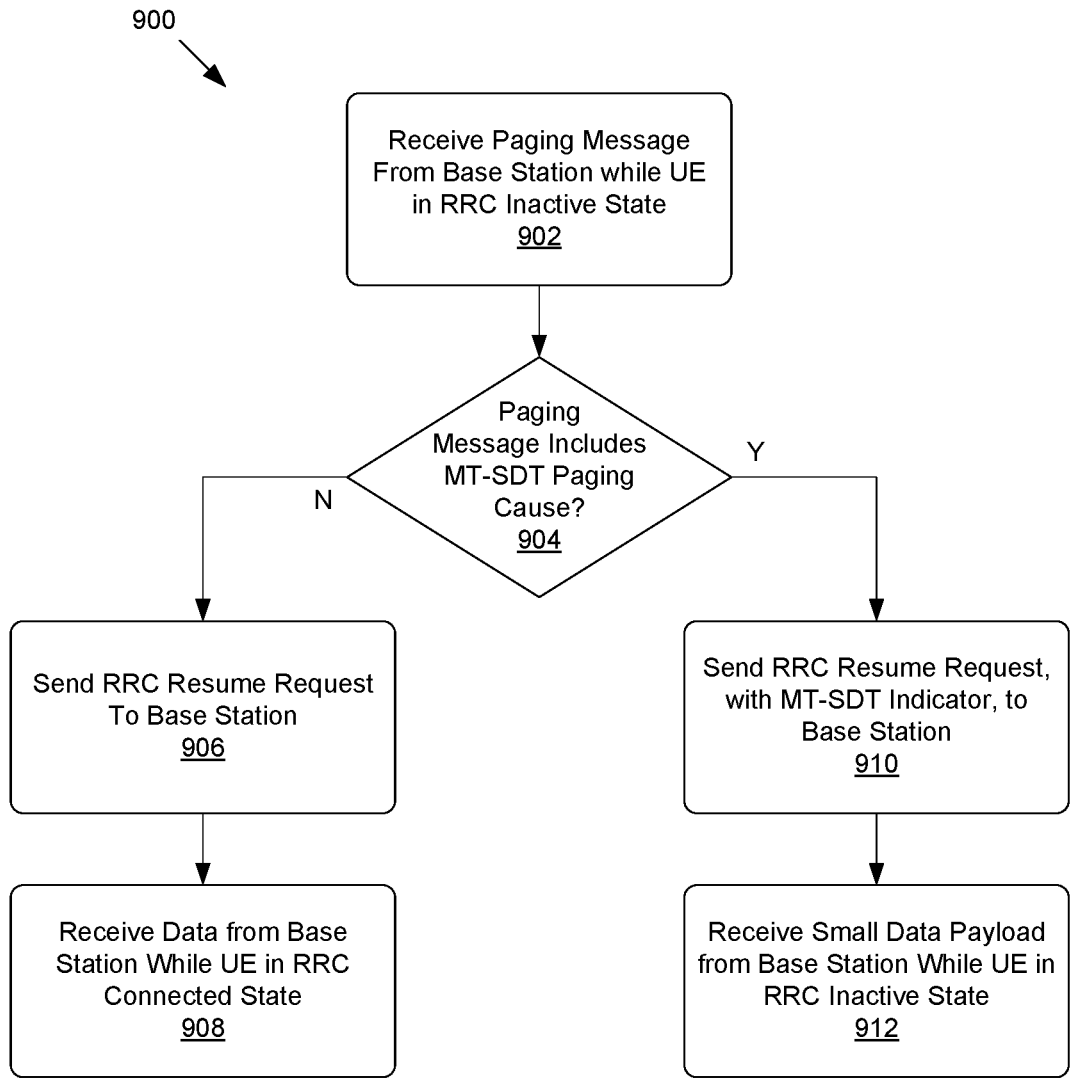
FIG. 9 shows a flowchart of an example method in which the UE can respond to a paging message from the base station while the UE is in the RRC Inactive state.

FIG. 9 shows a flowchart of an example method 900 in which the UE 102 can respond to a paging message from the base station 104 while the UE 102 is in the RRC Inactive state. At block 902, the UE 102 can receive the paging message while the UE 102 is in the RRC Inactive state. At least a portion of the paging message can be addressed to, or be associated with the UE 102, for instance via an I-RNTI or other identifier associated with the UE 102. For example, although the UE 102 can be in the RRC Inactive state, the UE 102 can periodically check to determine whether paging messages sent by one or more base stations, received by the UE 102 while in the RRC Inactive state, have portions that are addressed to an I-RNTI or other identifier associated with the UE 102. The UE 102 may be in the RRC Inactive state due to a suspension of a previously-established RRC connection, for instance based on an RRC release message with a suspend indication sent by the base station 104 or a different base station.

At block 904, the UE 102 can determine whether a portion of the paging message, associated with the UE 102, includes the MT-SDT paging cause 112. As discussed above, the MT-SDT paging cause 112 can be a particular value of a "PagingCause" field, such as "mt-SDT."

If the UE 102 determines at block 904 that the paging message does not include the MT-SDT paging cause 112 in association with the UE 102 (Block 904—No), for instance because the paging message include a "voice" paging cause, any other paging cause different from the MT-SDT paging cause 112, or no specific paging cause, the UE 102 can determine to move from the RRC Inactive state to the RRC Connected state to respond to the paging message. Accordingly, at block 906 the UE 102 can send an RRC resume request without the MT-SDT indicator 116 to the base station, and at block 908 can receive data from the base station while in the RRC connected state. In some examples, the UE 102 may later change back from the RRC Connected state to the RRC Idle state, such that the UE 102 can use the method 900 shown in FIG. 9 to respond to a subsequent paging message received while the UE 102 is in the RRC Idle state.

However, if the UE 102 determines at block 904 that the paging message does include the MT-SDT paging cause 112 in association with the UE 102 (Block 904—Yes), the UE 102 can determine based on the MT-SDT paging cause 112 that the UE 102 is being paged because a small data payload is available for the UE, and that the small data payload can be obtained via SDT procedures. The UE 102 can accordingly determine to use SDT procedures to obtain the small data payload in response to the paging message that includes the MT-SDT paging cause 112. The UE 102 can therefore respond to the paging message by sending an RRC resume request that includes the MT-SDT indicator 116 to the base station. In some examples, the MT-SDT indicator 116 can be a particular value of a "ResumeCause" field of the RRC resume request 114 that is associated with MT-SDT procedures. In other examples, the MT-SDT indicator 116 can be a particular value of an uplink payload portion of the RRC resume request 114, such as "0" or "−1," that indicates a request for MT-SDT procedures.

At block 912, in response to sending the RRC resume request that includes the MT-SDT indicator 116, the UE 102 can receive the small data payload from the base station via SDT procedures while the UE 102 remains in the RRC Inactive state. For example, the UE 102 can receive an RRC resume message from the base station 104 that identifies one or more DRBs associated with an RRC connection that are being resumed, and the UE 102 can receive the small data payload 108 from the base station 104 via the one or more resumed DRBs while the UE 102 is still in the RRC Inactive state. The UE 102 can also receive an RRC release message from the base station 104 that includes a suspend indication, separately or along with the small data payload. The suspend indication in the RRC release message can indicate that the RRC connection is suspended and is not being fully released, and thus cause the UE 102 to remain in the RRC Inactive state instead of moving to the RRC Idle state. Accordingly, the UE 102 can use the method 900 shown in FIG. 9 to respond to a subsequent paging message received while the UE 102 is in the RRC Idle state, such as a subsequent paging message associated with another small data payload.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   determining, by a base station of a telecommunication network, that a small data payload is available for a mobile terminating (MT) user equipment (UE), wherein the MT UE is:
      in a Radio Resource Control (RRC) Inactive state, and
      is associated with an RRC connection that has been suspended;
   sending, by the base station, and to the MT UE, a paging message that includes a mobile terminating small data transmission (MT-SDT) paging cause, wherein:
      the MT-SDT paging cause indicates that the MT UE can obtain the small data payload via small data transmission (SDT) procedures via one or more data radio bearers (DRBs) associated with the RRC connection while the MT UE remains in the RRC Inactive state;
   receiving, by the base station, an RRC resume request from the MT UE in response to the paging message, wherein:
      an uplink payload portion of the RRC resume request expresses a predefined value indicative of a request by the MT UE to use the SDT procedures to obtain the small data payload;
   resuming, by the base station, the one or more DRBs associated with the RRC connection; and
   sending, by the base station, the small data payload to the MT UE via the one or more DRBs associated with the RRC connection.

2. The method of claim 1, wherein the MT-SDT paging cause is expressed as a value of a paging cause field of a portion of the paging message addressed to the MT UE.

3. The method of claim 1, further comprising:
   sending, by the base station, an RRC release message to the MT UE, wherein a suspend indication in the RRC release message indicates that the RRC connection is suspended and causes the MT UE to remain in the RRC Inactive state.

4. The method of claim 1, wherein the predefined value of the uplink payload portion of the RRC resume request, indicative of the request by the MT UE to use the SDT procedures to obtain the small data payload, differs from a second predefined value indicative of a second type of request by the MT UE to use mobile originating (MO)-SDT procedures in association with the base station.

5. The method of claim 4, wherein:
   the predefined value of the uplink payload portion, indicative of the request by the MT UE to use SDT procedures to obtain the small data payload, is a non-positive value, and
   the second predefined value, indicative of the second type of request to use the MO-SDT procedures, is a positive value.

6. The method of claim 1, wherein:
   the SDT procedures are four-step random access small data transmission (RA-SDT) procedures that comprise exchanges of a first message, a second message, a third message, and a fourth message between the MT UE and the base station,
   the RRC resume request is included in the third message from the MT UE, and
   the base station sends the small data payload to the MT UE in response to the third message.

7. The method of claim 1, wherein:
   the SDT procedures are two-step random access small data transmission (RA-SDT) procedures that comprise exchanges of a first message and a second message between the MT UE and the base station,
   the RRC resume request is included in the first message from the MT UE, and
   the base station sends the small data payload to the MT UE in response to the first message.

8. The method of claim 1, wherein:
   the SDT procedures are configured grant small data transmission (CG-SDT) procedures associated with a configured grant configuration previously provided by the base station to the MT UE,
   the RRC resume request is included in a configured grant (CG) Physical Uplink Shared Channel (PUSCH) transmission from the UE, and
   the base station sends the small data payload to the MT UE in response to the CG PUSCH transmission.

9. A base station of a telecommunication network, comprising:
   one or more processors, and
   memory storing computer-executable instructions that, when executed by the one or more processors, cause the one or more processors to perform operations comprising:
      determining that a small data payload is available for a mobile terminating (MT) user equipment (UE), wherein the MT UE;
         is in a Radio Resource Control (RRC) Inactive state, and
         is associated with an RRC connection that has been suspended;
      sending, to the MT UE, a paging message that includes a mobile terminating small data transmission (MT-SDT) paging cause, wherein:

the MT-SDT paging cause indicates that the MT UE can obtain the small data payload via small data transmission (SDT) procedures via one or more data radio bearers (DRBs) associated with the RRC connection while the MT UE remains in the RRC Inactive state;

receiving an RRC resume request from the MT UE in response to the paging message, wherein:
an uplink payload portion of the RRC resume request expresses a predefined value indicative of a request by the MT UE to use the SDT procedures to obtain the small data payload;
resuming the one or more DRBs associated with the RRC connection; and
sending the small data payload to the MT UE via the one or more DRBs associated with the RRC connection.

10. The base station of claim 9, wherein the MT-SDT paging cause is expressed as a value of a paging cause field of a portion of the paging message addressed to the MT UE.

11. The base station of claim 9, wherein the operations further comprise sending an RRC release message to the MT UE, wherein a suspend indication in the RRC release message indicates that the RRC connection is suspended and causes the MT UE to remain in the RRC Inactive state.

12. The base station of claim 9, wherein the predefined value of the uplink payload portion of the RRC resume request, indicative of the request by the MT UE to use the SDT procedures to obtain the small data payload, differs from a second predefined value indicative of a second type of request by the MT UE to use mobile originating (MO)-SDT procedures in association with the base station.

13. The base station of claim 12, wherein:
the predefined value of the uplink payload portion, indicative of the request by the MT UE to use SDT procedures to obtain the small data payload, is a non-positive value, and
the second predefined value, indicative of the second type of request to use the MO-SDT procedures, is a positive value.

14. The base station of claim 9, wherein the SDT procedures are one of:
four-step random access small data transmission (RA-SDT) procedures,
two-step RA-SDT procedures, or
configured grant small data transmission (CG-SDT) procedures.

15. A mobile terminating (MT) user equipment (UE), comprising:
one or more processors, and
memory storing computer-executable instructions that, when executed by the one or more processors, cause the one or more processors to perform operations comprising:

receiving, from a base station of a telecommunication network, and while the MT UE is in a Radio Resource Control (RRC) Inactive state based on a suspension of an RRC connection, a paging message;
determining that a portion of the paging message associated with the MT UE includes a terminating small data transmission (MT-SDT) paging cause indicating that a small data payload is available for the MT UE;
determining to obtain the small data payload using small data transmission (SDT) procedures while the MT UE remains in the RRC Inactive state;
sending an RRC resume request to the base station, wherein an uplink payload portion of the RRC resume request expresses a predefined value indicative of a request by the MT UE to obtain the small data payload via the SDT procedures; and
receiving the small data payload from the base station via the SDT procedures, via one or more resumed data radio bearers associated with the RRC connection, while the MT UE remains in the RRC Inactive state.

16. The MT UE of claim 15, wherein the MT-SDT paging cause is expressed as a value of a paging cause field of the portion of the paging message.

17. The MT UE of claim 15, wherein the predefined value of the uplink payload portion of the RRC resume request, indicative of the request by the MT UE to use the SDT procedures to obtain the small data payload, differs from a second predefined value indicative of a second type of request by the MT UE to use mobile originating (MO)-SDT procedures in association with the base station.

18. The MT UE of claim 17, wherein:
the predefined value of the uplink payload portion, indicative of the request by the MT UE to use SDT procedures to obtain the small data payload, is a non-positive value, and
the second predefined value, indicative of the second type of request to use the MO-SDT procedures, is a positive value.

19. The MT UE of claim 15, further comprising receiving, from the base station, an RRC release message comprising a suspend indication that indicates that the RRC connection is suspended and that causes the MT UE to remain in the RRC Inactive state.

20. The MT UE of claim 15, wherein the SDT procedures are one of:
four-step random access small data transmission (RA-SDT) procedures,
two-step RA-SDT procedures, or
configured grant small data transmission (CG-SDT) procedures.

* * * * *